United States Patent [19]

Grubb et al.

[11] Patent Number: 5,768,684
[45] Date of Patent: Jun. 16, 1998

[54] METHOD AND APPARATUS FOR BI-DIRECTIONAL POWER CONTROL IN A DIGITAL COMMUNICATION SYSTEM

[75] Inventors: Jerrold Lee Grubb, Gilbert; Stanley William Attwood, Sun Lakes, both of Ariz.; John William Arens, Grayslake, Ill.

[73] Assignee: Motorola, Inc., Schaumburg, Ill.

[21] Appl. No.: 702,851

[22] Filed: Aug. 26, 1996

Related U.S. Application Data

[63] Continuation of Ser. No. 205,432, Mar. 4, 1994, abandoned.

[51] Int. Cl.⁶ ............................................ H04B 7/185
[52] U.S. Cl. ............... 455/13.4; 455/12.1; 455/427; 455/504; 455/522; 455/69; 370/318
[58] Field of Search ..................... 455/69, 33.1, 70, 455/13.4, 13.1, 53.1, 54.1, 54.2, 56.1, 67.1, 427, 430, 517, 522, 524, 507, 12.1, 504; 342/352, 354; 370/310, 318, 321, 316, 347, 337

[56] References Cited

U.S. PATENT DOCUMENTS

| | | |
|---|---|---|
| 2,678,998 | 5/1954 | Young . |
| 3,732,496 | 5/1973 | Boyer . |
| 3,906,166 | 9/1975 | Cooper et al. . |
| 4,228,538 | 10/1980 | Scharla-Nielsen et al. . |
| 4,261,054 | 4/1981 | Scharla-Nielsen . |
| 4,435,840 | 3/1984 | Kojima et al. . |
| 4,580,262 | 4/1986 | Naylor et al. ........................ 455/69 |
| 4,613,990 | 9/1986 | Halpern . |
| 4,776,035 | 10/1988 | Duggan ................................ 455/69 |
| 4,777,653 | 10/1988 | Bonnerot et al. .................... 455/69 |
| 5,003,619 | 3/1991 | Morris et al. . |
| 5,056,109 | 10/1991 | Gilhousen et al. . |
| 5,093,840 | 3/1992 | Schilling . |
| 5,093,842 | 3/1992 | Gimlin et al. ....................... 455/69 |
| 5,239,670 | 8/1993 | Schwendeman et al. ......... 455/13.4 |
| 5,297,161 | 3/1994 | Ling .................................... 455/69 |
| 5,329,547 | 7/1994 | Ling .................................... 375/1 |
| 5,333,175 | 7/1994 | Ariyavisitakul et al. ........ 455/38.3 |
| 5,367,305 | 11/1994 | Jan et al. .......................... 455/33.1 |
| 5,555,257 | 9/1996 | Dent ................................. 455/54.1 |

OTHER PUBLICATIONS

Ellen Pickthall et al, "Modern Science & Technology Telecommunications", Special Issue on Mobile Satellite Communications, Nov. 1991 (Consecutive No. 142), pp. 1–51.
Jerry L. Grubb, "The Traveler's Dream Come True", Iridium Overview, IEEE Communications Magazine, Nov. 1991, pp. 48–51.
Raymond J. Leopold et al., "The Iridium System: A New Paradigm In Personal Communications", Applied Microwave & Wireless, pp. 68, 70, 72, 74, 76, 78.

*Primary Examiner*—Reinhard J. Eisenzopf
*Assistant Examiner*—Doris To
*Attorney, Agent, or Firm*—Gregory J. Gorrie

[57] ABSTRACT

In a method and apparatus for maintaining a minimum transmission power level between two communication stations, each station measures the other's received signal quality, and returns an indication of signal quality as part of a regular maintenance burst. Each station adjusts its own transmission power level based on the returned signal quality indication. The signal quality indication is based on the received ratio of bit energy to total noise power spectral density which is calculated from an estimated bit-error-rate.

8 Claims, 7 Drawing Sheets

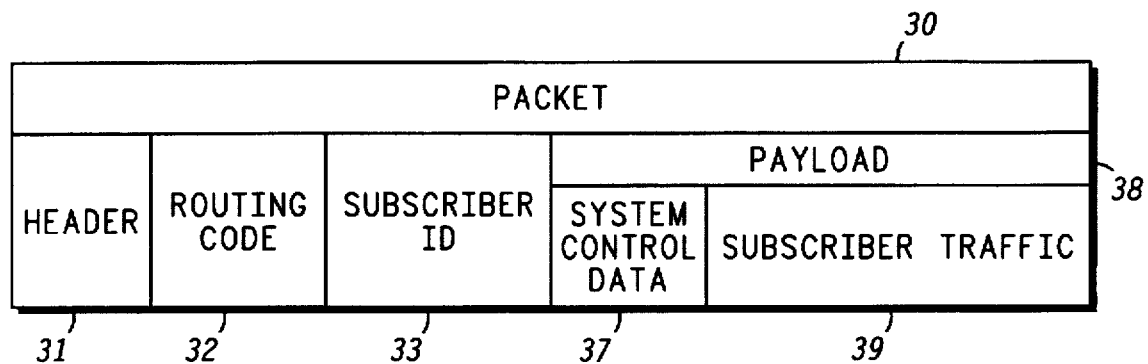
FIG. 2
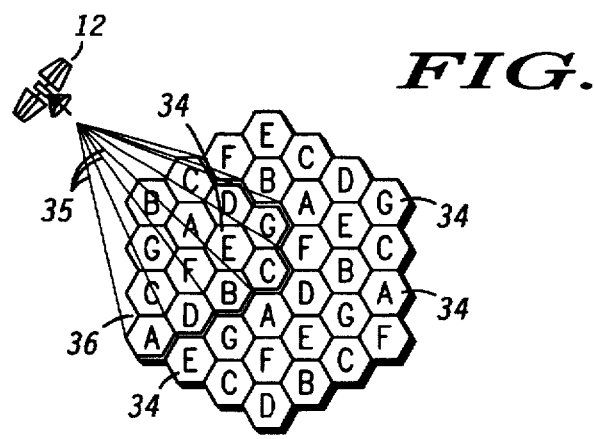
FIG. 3
FIG. 4
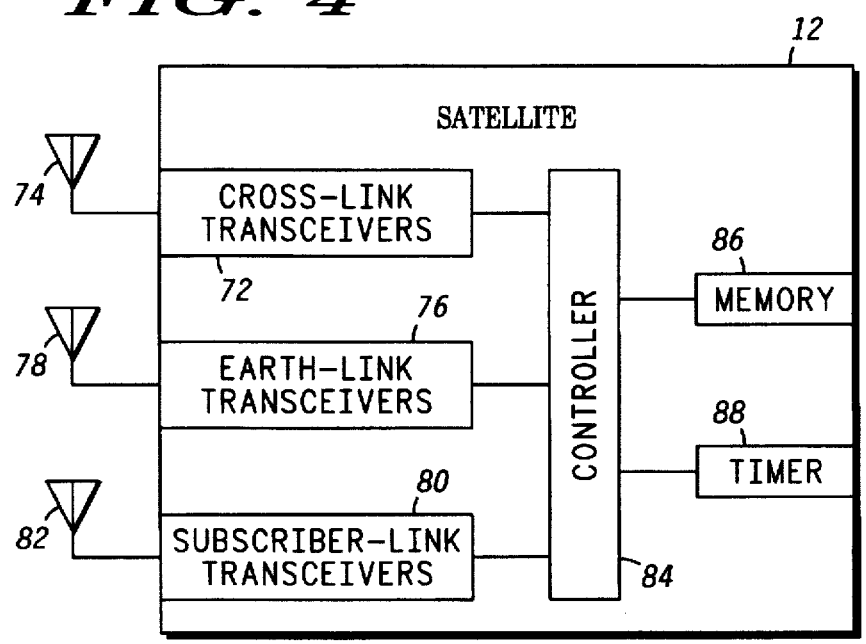

METHOD AND APPARATUS FOR BI-DIRECTIONAL POWER CONTROL IN A DIGITAL COMMUNICATION SYSTEM

This application is a continuation of prior application Ser. No. 08/205,432 filed Mar. 4, 1994 now abandoned.

TECHNICAL FIELD OF THE INVENTION

The present invention relates generally to communication systems. More specifically, the present invention relates to communication systems that divide an area within which communications are to take place into cells and allocates limited spectral resources among the various users in the cells.

BACKGROUND OF THE INVENTION

Subscriber units in conventional cellular communication systems adopt a method to control transmission power levels. Generally speaking, system antennas are erected at spaced apart locations. Each system antenna, along with transmitter power, receiver sensitivity, and geographical features, defines a cell location and size. A cell is a geographical area on the surface of the Earth within which communications may take place via a subscriber unit having predetermined operating characteristics and via the cell's antenna. In a cellular system that efficiently uses the spectrum allocated to it, system antennas are located to minimize overlap between their respective cells and to reduce gaps between the cells.

The spectrum allocated to a conventional cellular system is divided into a few discrete portions, typically frequency bands (also referred to as "channels"). Each cell is allocated one or more of the discrete portions of the spectrum, and each cell is preferably surrounded by cells that use other discrete portions of the spectrum. Communications within a cell use only the discrete portion of the spectrum allocated to the cell, and interference between communications taking place in other nearby cells is minimized because communications in such nearby cells use different portions of the spectrum. Co-channel cells are cells that reuse the same discrete portion of spectrum. To minimize interference, the frequency reuse plan spaces co-channel cells a predetermined distance apart.

In satellite based communication systems where subscriber units communicate to space based communication nodes, the transmit power of the space based nodes is limited by the resources available to the spacecraft. For example, batteries and solar-cells only can provide finite energy for the spacecraft to perform its functions including providing sufficient transmit power for subscriber units. This is unlike conventional cellular communication systems where transmit power is generally not limited by energy resources as in satellite based systems.

Typically, in conventional cellular communication systems, subscriber units use a level of received power to adjust their output power level. One problem with this technique is that the transmission power level of base stations transmitting to individual subscriber units is not controlled, thereby transmitting excessive power when it not needed and not transmitting enough power to a subscriber unit when it is needed. Further, received power measurements alone do not provide the necessary measure of performance for power control. For example, the presence of co-channel interference and the noise power ratio (NPR) intermodulation effect within the transmitter cause the apparent received signal power to increase. In this situation, the desired signal power output would be reduced when, in effect, it should be increased, because the total received signal power is greater than the actual signal power received.

Another problem with this technique is that it does not take into account situations where the subscriber unit and base station are in different interference environments, for example where a subscriber unit is under heavy interference and may require more transmit power from the base station, while the subscriber unit only needs to transmit at a minimum level. Further, conventional cellular systems do not take into account situations having non-reciprocal link characteristics, for example where the uplink is on a different frequency channel or band than the downlink. Furthermore, conventional cellular systems do not consider the quality of received signals (i.e. signal-to-noise ratio, bit-error-rate, etc.) in adjusting power levels of the transmitter.

Thus what is needed is dynamic power control of transmission power of each communication station in a communication system. What is further needed for satellite communication systems is a method and apparatus to provide for adjustment of transmission power of satellite transmitting stations not only to conserve power, but so that the lowest reliable power level will be emitted and thereby reduce the likelihood of interference among co-channel cells of nearby antenna beams engaged in different calls. What is further needed is a method and apparatus for controlling power level adjustments of the transmission power of a transmitting station based on the true signal quality received at a receiving station, rather than based on signal strength. What is further needed is a method and apparatus for independent dynamic power control of a satellite transmitter and a mobile unit transmitter. What is also needed is independent power control of each link with non- reciprocal link propagation characteristics. What is also needed is independent power control when transmitting stations are in different interference environments. Further, what is needed is a method and apparatus that provide reciprocal signal quality information on a link or channel separate from the communication link channel.

SUMMARY OF THE INVENTION

An advantage of the present invention is to provide a method of controlling transmission power levels between a mobile unit and a node of a communication system comprising the step of sending over a communication link at a transmission power level, a communication from the node to the mobile unit. The method also includes receiving at the node from the mobile unit, a link-quality indicator (LQI) representing the quality of the communication on the communication link. The method also includes adjusting at the node, based on the LQI, the transmission power level of the communication link.

In a preferred embodiment, the method further comprises the steps of receiving a second communication on a second communication link, generating by the communication system a second LQI for the second communication link based on a quality level of the second communication and sending the second LQI to the mobile unit. The mobile unit is responsive to the second LQI.

The invention also provides a method of operating a node of a communication system that communicates with a plurality of mobile units over a plurality of orthogonal frequency channels that are time division multiplexed (TDM). Each active mobile unit is dynamically assigned a frequency channel and time-slot. The method comprises receiving, during assigned time-slots from each mobile unit of the plurality engaged in communication with the node, a LQI for each mobile unit. The LQI represents the quality of a communication link established with each mobile unit. The method also comprises adjusting a transmission power level at the node during each time-slot assigned to each mobile unit based on the LQI received from each mobile unit.

In a preferred embodiment, the method includes the LQI generated by each mobile unit by estimating the bit-error-rate of signals sent from the node to each mobile unit.

The invention also provides a method of operating a subscriber unit comprising the step of sending over a first communication link in a transmit time-slot assigned to the subscriber unit, a first communication from the subscriber unit to a node of a communication system. The method also includes receiving from the node at the subscriber unit, a second communication which includes a link-quality indicator (LQI) representing the quality of the first communication sent by the node over the first communication link. The method also includes the step of adjusting a transmission power level of the subscriber unit during future transmit time-slots assigned to the subscriber unit, the adjusting step based on the LQI.

The invention also provides a communication system comprising a multi-channel transceiver capable of transmitting and receiving orthogonal channel sets. The transceiver sends over a communication link a communication from a node of the communication system to a mobile unit, and it receives at the node from the mobile unit a link-quality indicator (LQI) representing the quality of the communication on the communication link. The system also includes a processor coupled to the multi-channel transceiver for controlling the transceiver to adjust a transmission power level of the communication link based on the LQI.

In a preferred embodiment, the invention provides a communication system wherein the transceiver receives a second communication on a second communication link and the processor generates a second LQI for the second communication link based on a quality level of the second communication and directs the transceiver to send the second LQI to the mobile unit. The mobile unit is responsive to the second LQI, and the quality level is determined by the ratio of a received energy per bit to total noise power spectral density of the second communication.

BRIEF DESCRIPTION OF THE DRAWINGS

FIG. 2 illustrates an example of an exemplary data packet used to transport communications in a preferred embodiment of the present invention;

FIG. 3 illustrates a simplified diagram of a portion of a cellular pattern formed on the surface of the Earth by satellites for the communication system of FIG. 1;

FIG. 4 illustrates a simplified block diagram of a satellite radio communication station suitable for use in a preferred embodiment of the present invention;

DETAILED DESCRIPTION OF THE DRAWINGS

A "satellite" is defined herein to mean a man-made object or vehicle intended to orbit a celestial body (e.g., Earth). The word Earth is intended to include any celestial body around which a communication satellite may orbit. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The term "satellite" is intended to include both geostationary and orbiting satellites and/or combinations thereof including low Earth orbiting (LEO) satellites.

Figure 1:
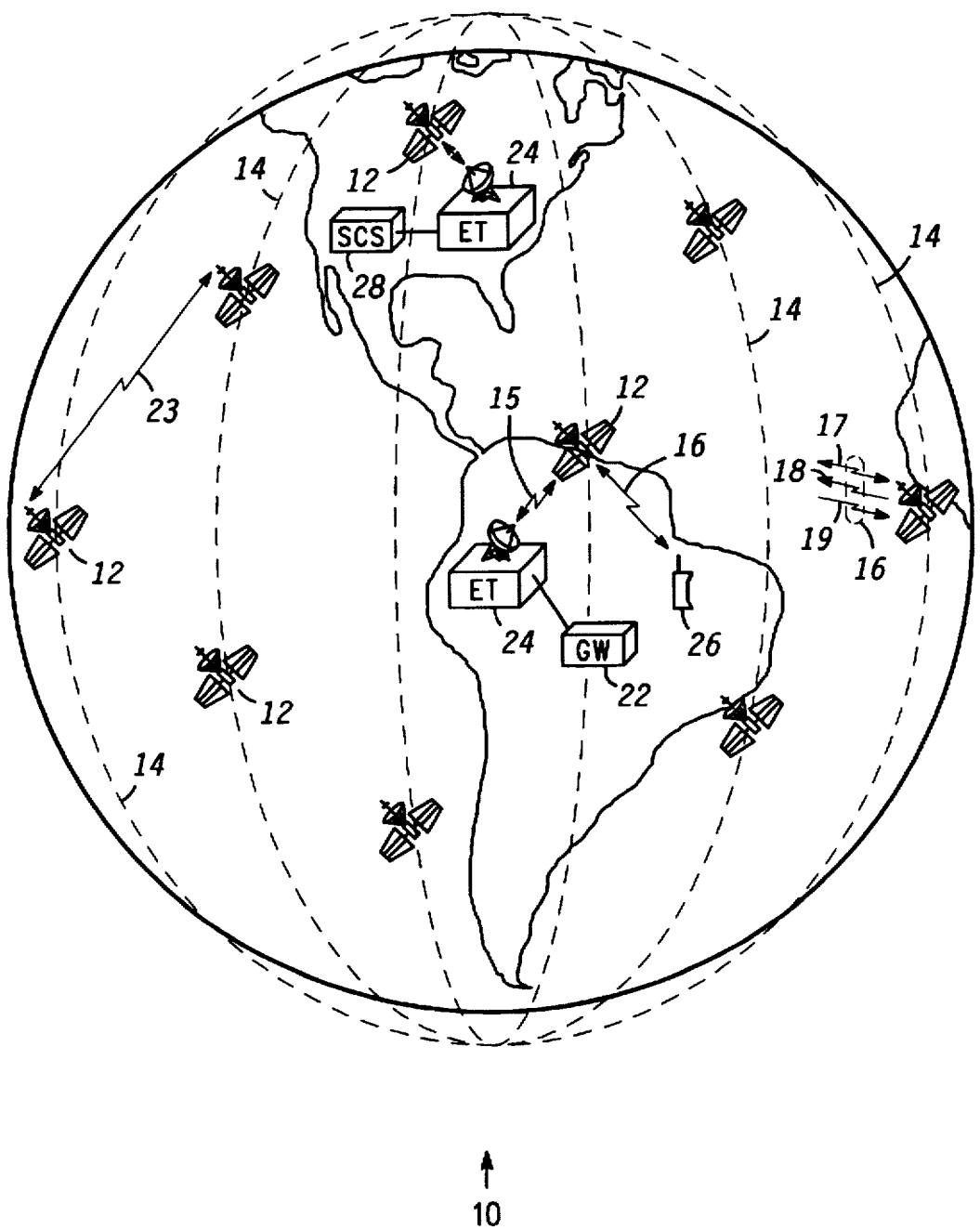
FIG. 1 illustrates a highly simplified diagram of a satellite based communication system.

FIG. 1 illustrates a highly simplified diagram of satellite-based communication system 10, dispersed over and surrounding a celestial body (e.g., Earth) through use of orbiting satellites 12 occupying orbits 14. The present invention is applicable to systems including satellites having low-Earth, medium-Earth and geo-synchronous orbits. Additionally, it is applicable to orbits having any angle of inclination (e.g., polar, equatorial or other orbital pattern).

Exemplary communication system 10 uses six polar orbits 14, with each orbit 14 holding eleven satellites 12 for a total of sixty-six satellites 12. However, this is not essential, and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and Earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be hand-held, portable cellular telephones adapted to communicate with satellites 12. SUs 26 may also be ground based mobile units. Ordinarily, SUs 26 need not perform any control functions for communication system 10.

Network 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In one embodiment of the present invention, each traffic channel 17 encompasses separate uplink and downlink frequency channels. In a preferred embodiment of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the Earth may be routed through the constellation of satellites 12 to within range of substantially any other point on the surface of the Earth. A communication may be routed down to a subscriber unit 26 on or near the surface of the Earth from a satellite 12 using a subscriber link 16. Alternatively, a communication may be routed down to or up from any of many ETs 24, of which FIG. 1 shows only two, through Earth links 15. ETs 24 are preferably distributed over the surface of the Earth in accordance with geopolitical boundaries. In a preferred embodiment, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations of satellites 12 where full coverage of the Earth is not achieved (i.e., where there are "holes" in the communications coverage provided by the constellation) and constellations where plural coverage of portions of Earth occur (i.e., more than one satellite is in view of a point on the Earth's surface).

FIG. 2 illustrates an example of an exemplary data packet used to transport communications in a preferred embodiment of the present invention. As discussed above, communications in the preferred embodiments are configured into a digital format. FIG. 2 shows exemplary data packet 30 that may be used to transport a communication to subscriber unit 26. Packet 30 includes header 31 which carries data identifying a type characterization to be associated with packet 30, a length to be associated with packet 30, and any other information conventionally included in data packet headers. The type characterization may indicate whether packet 30 exclusively conveys system control messages or whether it conveys subscriber traffic. Routing code 32 instructs system 10 (FIG. 1) where to deliver packet 30.

Subscriber ID 33 represents a code that uniquely identifies subscriber unit 26 and that is known to the identified subscriber unit and any satellite 12 (FIG. 1) providing traffic channel 17 (FIG. 1) to subscriber unit 26. Subscriber unit 26 monitors subscriber IDs 33 transmitted over broadcast channel 18 (FIG. 1) to determine if packets 30 are intended for it. Satellite 12 uses subscriber IDs 33 of packets 30 that carry subscriber unit traffic to route such packets 30 to traffic channels 17 assigned to the identified subscriber unit 26.

Header 31, routing code 32, and subscriber ID 33 represent overhead data which serve to get packet 30 to its destination. At the packet's destination, payload data 38 are consumed. In other words, the purpose of sending packet 30 to a destination is typically to deliver payload data 38, not header 31, routing code 32, or subscriber ID 33. Payload data 38 includes either system control data 37 or system control data 37 together with subscriber traffic 39 (e.g., voice and/or data). System control data are commands or messages which are interpreted and acted upon by subscriber units 26. These commands are typically very short. When system control data are delivered over broadcast channel 18, subscriber traffic 39 is omitted, and the resulting packet is very short so that as many messages as possible may be broadcast over broadcast channel 18. Subscriber traffic 39 represents all subscriber data transported in the course of a call. When packet 30 is delivered over traffic channel 17, a significant amount of subscriber traffic is appended. As discussed above, a digitized version of an entire frame of conversational audio may be conveyed by subscriber traffic 39.

Compared to the size of subscriber traffic 39, the length of system control data 37 is relatively short. Thus, system control data 37 may be delivered to subscriber unit 26 along with subscriber traffic 39 while a call is ongoing. Examples of system control messages which may be delivered with subscriber traffic 39 via a traffic channel 17 include messages which inform subscriber unit 26 that the other party to a call has "hung-up", that another call is waiting for the subscriber unit 26, and any number of annunciation data messages which result in a voice message or another form of annunciation being presented to the user of subscriber unit 26. An annunciation which may be presented to the user while a call is ongoing may, for example, warn a user when communication services are soon to become unavailable or when a service condition warrants.

System control data 37 may also include information on link-quality and desirably includes a link-quality indicator (LQI). The LQI informs a transmitting station (i.e., subscriber unit 26 or satellite node 12) whether or not the power level being received at a receiving station (i.e., satellite node 12 or subscriber unit 26) is sufficient for acceptable communication quality. In one embodiment, the LQI classifies the signal quality as excessively good, just right, not good enough or lost signal. Depending on the condition dictated by the LQI, the transmitting station will desirably increase, decrease or maintain the same transmission power level. In a preferred embodiment, the LQI indicated to the transmitting station how much to increase or decrease its transmission power level. The LQI preferably is encoded in two or three bits dedicated to this function. For example, satellite node 12 may receive a LQI from subscriber unit 26 indicating that the signal quality is not good enough. Satellite node 12 responds by increasing its transmission power to subscriber unit 26, for example by 1 or 2 dB, or maximum power. If satellite node 12 can do so, it will increase its transmission power level to subscriber unit 26 during a time-slot assigned to subscriber unit 26. The power level to other SUs 26 communicating in other time-slots will not be affected, except as directed by their own LQI's. In another preferred embodiment, subscriber unit 26 receives a LQI from satellite node 12 and the reverse process occurs. This process is described in more detail with reference to FIGS. 7–10.

FIG. 3 illustrates a simplified diagram of a portion of a cellular pattern formed on the surface of the Earth by satellites for the communication system of FIG. 1. Each satellite 12 includes an array (not shown) of directional antennas. Each array projects numerous discrete antenna beams 35 on the Earth's surface at numerous diverse angles away from its satellite 12. FIG. 3 shows a diagram of a resulting pattern of cells 34 that satellites 12 form on the surface of the Earth. A footprint region 36, which is bounded by a double line in FIG. 3, results from the antenna beams 35 produced by an antenna array of a single satellite 12. Cells 34, which reside outside of region 36, are produced by antenna arrays from other satellites 12.

The precise number of channel sets into which the spectrum used by satellites 12 is divided is not important to the present invention. FIG. 3 illustrates an exemplary assignment of channel sets to cells 34 in accordance with the present invention and in accordance with a division of the spectrum into seven discrete channel sets. FIG. 3 references the seven discrete channel sets through the use of the characters "A", "B", "C", "D", "E", "F", and "G". Those skilled in the art will appreciate that a different number of channel sets, for example twelve, may be used and that, if a different number is used, the resulting assignment of channel sets to cells 34 will differ from the assignment pattern depicted in FIG. 3. Likewise, those skilled in the art will appreciate that each channel set may include one channel or any number of orthogonal channels therein. As illustrated in FIG. 3, the assignment of channel sets to cells 34 allows the limited spectrum to be reused in geographically spaced apart cells 34. In other words, non-orthogonal channel sets simultaneously carry communications without interference, because the cells 34 where the non-orthogonal channel sets are used are spaced apart from one another and do not overlap. Moreover, each subscriber unit 26 is capable of operating with any of the discrete channel sets, and the particular channel set used at any particular time by any particular subscriber unit 26 is controlled by communication system 10.

Typically, cellular communication systems use various methods to allocate the limited electo-magnetic spectrum available for each cell. In Frequency Division Multiplexing (FDM) or Frequency Division Multiple Access (FDMA) systems, specified sub-bands of frequency are allocated from the communication resource (i.e. the limited electromagnetic spectrum allocated for use). In a FDM/FDMA cellular communication system each cell is assigned to one of these groups of frequencies so as to not interfere with adjacent or nearby cells. For example, in a seven frequency reuse scheme, e.g. see FIG. 3, the frequency assignments are fixed to the seven discrete channel sets noted as characters "A", "B", "C", "D", "E", "F", and "G" as previously described. The seven frequency reuse arrangement of cells helps prevent interference between cells with identical frequency assignments (i.e. co-channel cells) by separating these cells by at least two cells of different frequency assignments, although it is more desirable to have only one cell separating co-channel cells.

Cellular communication systems also use Time Division Multiplexing (TDM) or Time Division Multiple Access (TDMA) where there are periodically recurring time-slots during which message information of a particular user is transmitted/received. The users are assigned to particular time-slots controlled by a master controller synchronized by a master clock. In reference to FIG. 3, each discrete channel set noted as characters "A", "B", "C", "D", "E", "F", and "G" can be assigned one time-slot. Each cell can use the same frequency channel or channel set without interference, because the users in each cell only receive or transmit information during their assigned time-slot. Each time-slot can include one message packet (i.e., single message time-slots) or can include multiple message packets (i.e., multiple sub-time-slots each including a single message).

In some applications, it is desirable to use a combination of FDMA and TDMA. For example, instead of using the same frequency channels or channel sets for a network and allocating different time-slots to different cells, it is possible to rotate frequencies among the cells and assign the same or different time-slot per cell. With FDMA and TDMA, some frequencies or time-slots are usually reserved for access signalling and/or control, and they are not ordinarily available for conventional conversations and/or user data transfer (i.e., for access protocol). Some channels and/or time-slots of the combination FDMA/TDMA system of a preferred embodiment of the present invention are also desirably reserved for the same purpose. FDMA and TDMA communication techniques and combinations thereof are well known to those of skill in the art.

The communication resource, (i.e. limited electromagnetic spectrum) can also be partitioned by the use of a hybrid combination of FDMA and TDMA known in the art as Code Division Multiplexing (CDM) or Code Division Multiple Access (CDMA). CDMA is a spread spectrum technique in which specified members of a set of orthogonal or nearly orthogonal spread spectrum codes are allocated, each using the full channel bandwidth. Two common spread spectrum techniques are direct-sequence and frequency hopping. These communication techniques are well known in the art.

Other techniques in the art for allocation of the communication resource include Space Diversity (SD) and Polarization Diversity (PD). In an SD system spot beam antennas can be used to separate radio signals by pointing in different directions. This also allows for reuse of the same frequency bands. In a PD communication system, orthogonal polarizations are used to separate signals also allowing for reuse of the same frequency bands. These communication techniques are also well known in the art.

While the specific communication technique (i.e. method of allocating the communication resource) is not important for the present invention, those of skill in the art will understand that any one or combination of the above described communication techniques can be used in the present invention with the exception of possibly CDMA.

FIG. 4 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 4. Satellite 12 includes cross-link transceivers 72 and associated antennas 74. Transceivers 72 and antennas 74 support cross-links to other nearby satellites 12. Earth-link transceivers 76 and associated antennas 78 support Earth-links to communicate with Earth terminals 24 (FIG. 1). Moreover, subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that subscriber-link antenna 82 be a phased array antenna capable of accessing many cells 34 (FIG. 1) simultaneously.

A controller 84 couples to each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Subscriber-link transceivers 80 are desirably multichannel FDMA/TDMA transceivers capable of transmitting and receiving on all different selectable frequencies during particular, selectable, time-slots as directed by controller 84. Subscriber-link transceivers 80 include multi-channel radios having sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions.

Subscriber-link transceivers 80 desirably provide for transmission and reception on any frequency channel set so that each subscriber-link transceivers 80 may, if needed, utilize the entire spectral capacity of all frequency channel sets by having the capability to handle all frequency and time-slot assignments. Subscriber-link transceivers 80 also have the capability to control transmission power levels separately for each frequency channel and during each time-slot of each frequency channel. This enables subscriber-link transceiver 80, as directed by controller 84, to communicate with any one of several thousand subscriber units at a power level specific to each subscriber unit 26.

Figure 5:
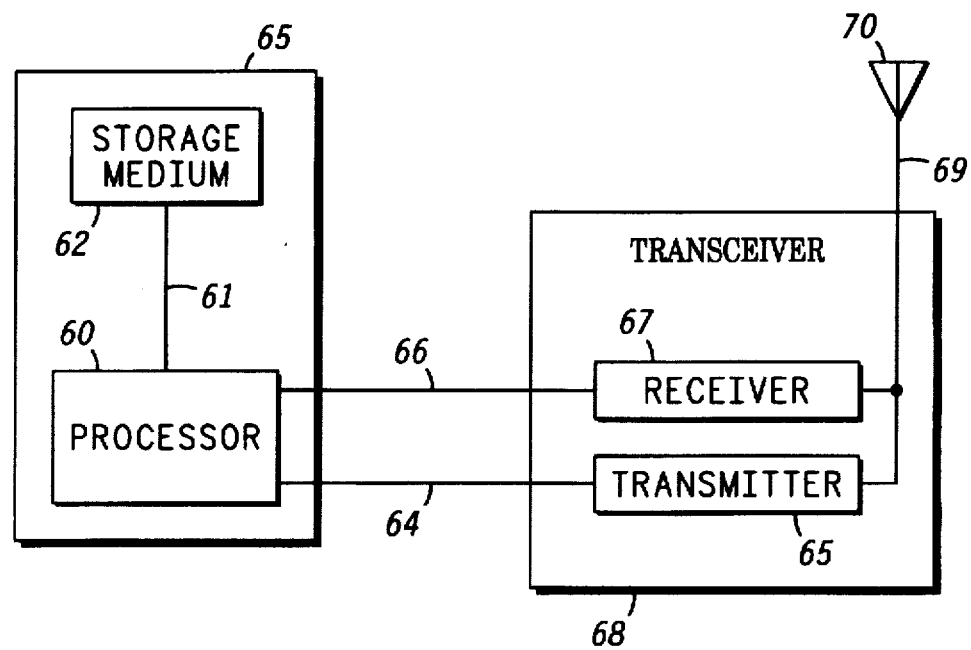
FIG. 5 illustrates a simplified block diagram of a system control station and an Earth terminal suitable for a preferred embodiment of the present invention.

FIG. 5 illustrates a simplified block diagram of a system control station and an Earth terminal suitable for a preferred embodiment of the present invention. Control station 65 and terrestrial station 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 63 and/or receiver 67 transmit messages to and/or receive messages from satellites 12. Processor 60 generally controls and manages user access, message reception and transmission, channel set-up, radio tuning, frequency and time-slot assignment, and other cellular radio communication and control functions not managed or provided for by controller 84 (FIG. 4). Among other things, processor 60 and/or controller 84 (FIG. 4) desirably execute procedures to allow user access to communication system 10. This may include procedures for protocols for channel setup and other associated functions as discussed below.

Figure 6:
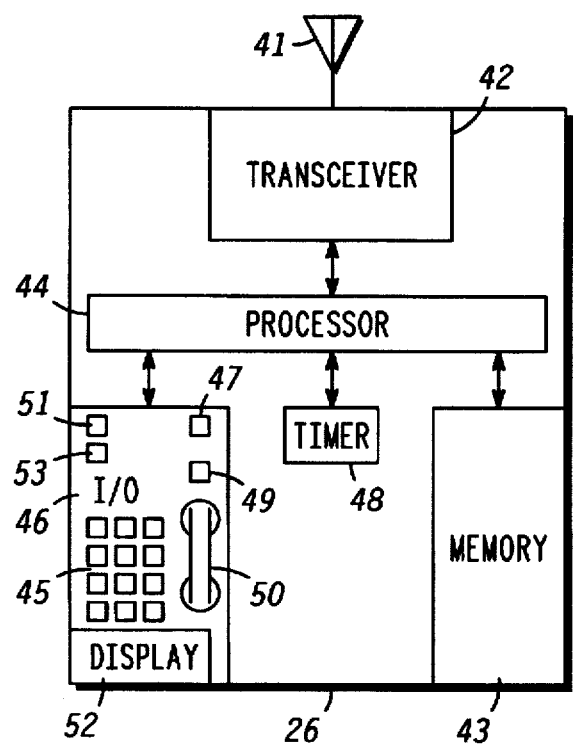
FIG. 6 illustrates a simplified block diagram of a subscriber unit suitable for a preferred embodiment of the present invention.

FIG. 6 illustrates a simplified block diagram of a subscriber unit suitable for a preferred embodiment of the present invention. Subscriber unit 26 (analogous to subscriber unit 26 of FIG. 1, communicates with communication system 10. SU 26 may also communicate through communication system 10 to other SUs 26 or another telecommunication device. Subscriber unit 26 includes transceiver 42 which transmits and receives signals to and from satellite node 12 using antenna 41. Transceiver 42 is desirably a multi-channel transceiver capable of transmitting and receiving on all frequency channels in specified time-slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of skill in the art will understand that the acquisition channel transceiver portion, the broadcast channel receiver portion and the traffic channel transceiver portion may be included in one unit capable of both functions. Transceiver 42 couples to a processor 44, which controls the frequency and timing parameters upon which transceiver 42 operates. In addition, processor 44 preferably controls the power level at which transceiver 42 transmits signals. Transceivers 42 also have capability to control transmission power levels separately for each frequency channel and during each time-slot of each frequency channel over which SU 26 communicates with satellite 12. This enables transceiver 42, as directed by processor 44, to communicate with a communication system at a specific power level.

Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing instructions to processor 44 which, when executed by processor 44, cause subscriber unit 26 to carry out procedures which are discussed below. In addition, memory 43 includes variables, tables, and databases that are manipulated due to the operation of subscriber unit 26.

Input/output (I/O) section 46 of subscriber unit 26 is used to collect inputs from a user of subscriber unit 26 and to provide outputs for the user to perceive. I/O section 46 desirably includes, for example, keypad 45 to collect numbers that identify a party to whom a call may be directed, power switch 47 to control the energization and de-energization of subscriber unit 26, send key 49 to indicate when a called party's number has been entered, and hook switch 51. Display 52 may desirably be used to present visual information to the user, and alarm or beeper 53 may desirably be used to provide an audible alert to the user. Handset or multitone 50 desirably transforms audible signals into electrical signals, and vice-versa.

Conventional cellular radio units and systems are described for example in U.S. Pat. Nos. 4,783,779, 4,144,412, and 5,097,499, and satellite communication systems are described for example in U.S. Pat. Nos. 4,722,083 and 4,819,227. These patents are herewith incorporated by reference. Subscriber-link antennas 82 (FIG. 4), subscriber-link transceivers 80 (FIG. 4), control station 28 (FIG. 1), subscriber unit 26 (FIG. 1) and Earth terminal 24 (FIG. 1) perform those functions and include at least those equipments conventionally associated with switched terrestrial or satellite cellular communication systems, plus additional functions and equipment explained in more detail below.

The signal quality through traffic channel 17 (see FIG. 1) between a satellite 12 and an SU 26 varies due to several other factors. One factor results from movement of satellite 12, which causes the distance between satellite 12 and SU 26 to change. Since satellites 12 orbit the Earth at relatively constant speeds and in contiguous predictable orbits 14, variation in signal quality occurs gradually due to this factor. Further, when satellite 12 is in low Earth orbit, as satellite 12 approaches the horizon (as viewed from subscriber unit) interference from trees, foliage, buildings and other objects affects signal quality. Other factors result from frequency and time-slot assignment changes that occur, for example, when a subscriber unit is handed off from one satellite to another.

In the preferred embodiments of system 10, the framing and management of the electromagnetic spectrum is desirably controlled by satellites 12 and/or SCS 28. SUs 26 adapt their operations to meet requirements established by satellites 12 and/or SCS 28. Referring back to FIG. 1, when subscriber units 26 are in communication with a satellite node 12, it is desirable for both the subscriber unit 26 and the satellite node 12 to operate with the lowest transmission power level necessary to achieve satisfactory communications. For example where SUs 26 are portable personal communication devices, it is desirable to conserve the limited battery resource of the SU 26 to extend the time and duration of operation.

In the case of satellite nodes 12, it is essential to conserve the limited energy resources available to a satellite. Satellite nodes 12, for example, may include solar panels and batteries to provide electrical energy for satellite operations. As discussed previously, the transmission power level requirements of satellite 12 may be very different from that of a subscriber unit. For example, satellite 12 may be transmitting and SU 26 may be receiving communications on one frequency channel or band, while SU 26 is transmitting and satellite 12 is receiving communications on a second frequency channel or band.

Figure 7:
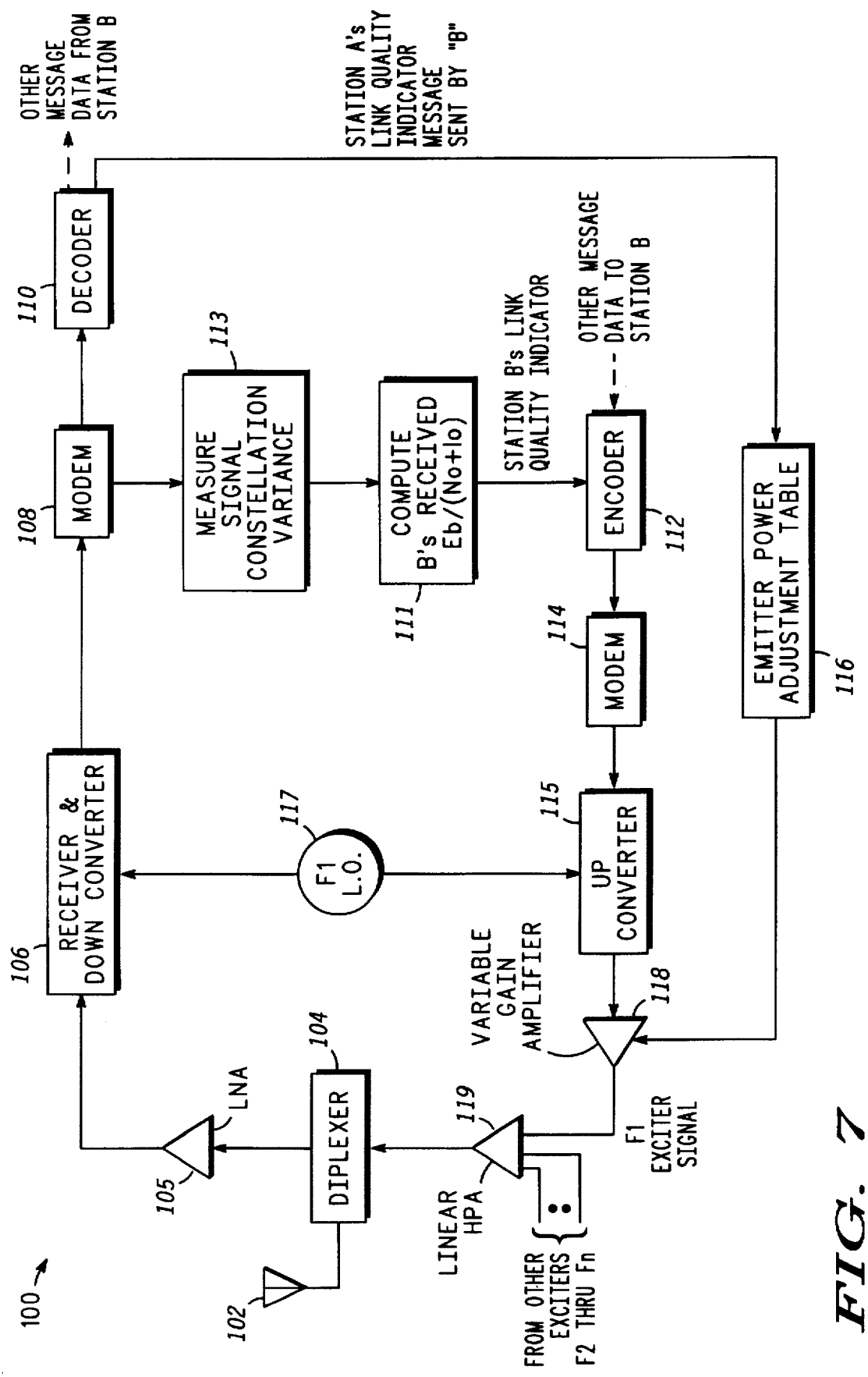
FIG. 7 shows an adaptive power control functional block diagram of the satellite radio communication station of FIG. 4 suitable for use in a preferred embodiment of the present invention.

FIG. 7 shows an adaptive power control functional block diagram of the satellite radio communication station of FIG. 4 suitable for use in a preferred embodiment of the present invention. Satellite radio communication station 100 is analogous to satellite radio communication station 12 of FIG. 1 and FIG. 4. For a preferred embodiment, the depiction of satellite radio communication station 100 in FIG. 7 illustrates functions performed by satellite node 12 as part of the adaptive power control functions. For example, the functions shown by satellite radio communication station 100 in FIG. 7 may be performed by cross-link transceivers 72 (FIG. 4), Earth-link transceivers 76 (FIG. 4) or subscriber-link transceivers 80 (FIG. 4) in conjunction with controller 84, memory 86 and timer 88 of satellite node 12 (FIG. 4).

As shown in FIG. 7, for example, satellite node 100 desirably includes diplexer 104 coupled to antenna 102, receiver portion 106 and linear high-power-amplifier 119 of the transmitter portion. Receiver portion 106 desirably includes low noise amplifier 105. Satellite node 100 also includes local oscillator 117, modems 108 and 114, decoder 110, encoder 112, up-converter 115 and variable gain amplifier 118 as shown in FIG. 7.

Communication station 100 includes means 113 to measure the signal quality and means 111 to compute the received energy per bit (Eb) to total noise power spectral density (No+Io) where No is the level of noise power spectral density and Io is the level of interference power spectral density. Communication station 100 also includes table 116 which defines, for example, the transmit power level adjustments based on link-quality.

Figure 8:
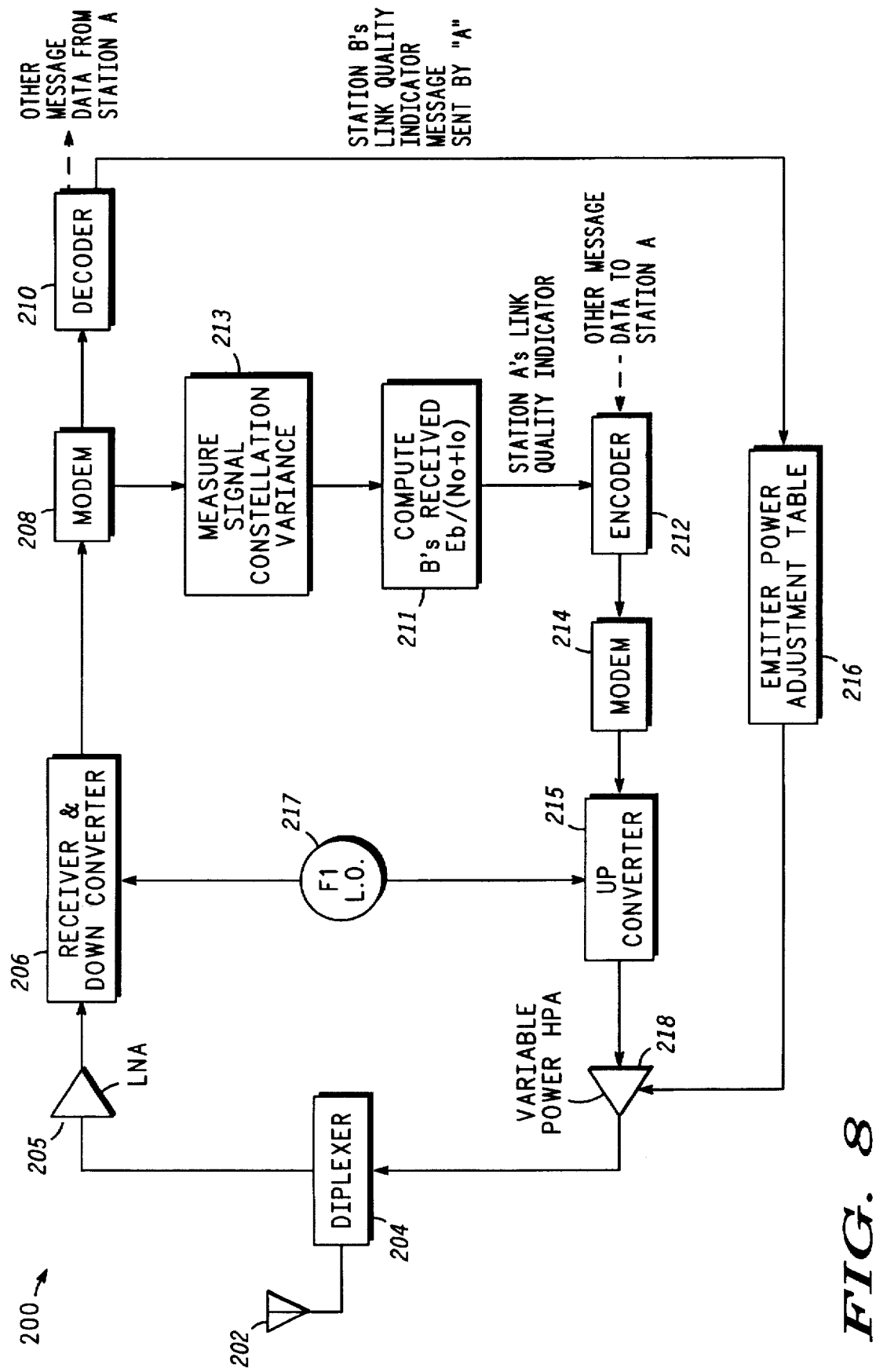
FIG. 8 shows an adaptive power control functional block diagram of the subscriber unit of FIG. 6 suitable for use in a preferred embodiment of the present invention.

FIG. 8 shows an adaptive power control functional block diagram of the subscriber unit of FIG. 6 suitable for use in a preferred embodiment of the present invention. Subscriber unit 200 is analogous to subscriber unit 26 of FIG. 1 and FIG. 6. In a preferred embodiment, the depiction of subscriber unit 200 illustrates functions performed by subscriber unit 26 (FIG. 6) as part of the adaptive power control functions. For example, the functions shown in subscriber unit 200 may by performed by transceivers 42 (FIG. 6) in conjunction with processor 44 (FIG. 6), memory 43 (FIG. 6) and timer 48 (FIG. 6) of subscriber unit 26 (FIG. 6).

In a preferred embodiment, subscriber unit 200 includes diplexer 204 coupled to antenna 202, receiver portion 206 through low noise amplifier 205, and upconverter 215 through high power amplifier 218. Subscriber unit 200 also includes local oscillator 217, modems 208 and 214, decoder 210, encoder 212, and up-converter 215 as shown in FIG. 8.

Subscriber unit 200 also includes means 213 to measure received signal quality and means 211 to compute a received energy per bit (Eb) to total noise power spectral density (No+Io). Subscriber unit 200 includes table 216 defining transmit power level adjustments correlated with link-quality indicators. This measure is used to command link transmitters (i.e., elements 116–119 (FIG. 7) and elements 216–218 (FIG. 8)) to adjust the transmitted signal power accordingly. The gain or attenuation is applied to the desired signal only at the transmitter. The desired signal may include specific frequency channels or bands, and or specific time-slots of those frequency channels or bands.

In reference to FIGS. 7 and 8, received signal quality is measured at satellite node 100 and/or subscriber unit 200 by computing the ratio of bit energy to total noise power spectral density (thermal noise power spectral density and interference noise power spectral density). This ratio can be expressed as Eb/(No+Io), where Eb is the energy per bit, No is the level of noise power spectral density and Io is the level of interference power spectral density. "No+Io" represents total noise power spectral density.

The bit energy to noise power spectral density ratio can be calculated in several ways including by measuring the bit-error-rate (BER) of the received signal. A BER is a direct measure of the digital signal channel performance. It is one of several measurements of voice channel performance. Typically, an improved BER is obtained by increased signal power. The BER is also a measure of performance that correctly assesses the signal to co-channel and noise power ratio interference correctly. This is a direct measurement; however with uncoded data, the BER is not directly measurable without some additional traffic overhead. With forward error correction encoding, the syndrome or intensity of corrections being made can be measured in a Veterbi decoder to determine a good measure of the error rate. For example, using an ERF function, a BER of 1E-3 would produce an uncoded signal with a Eb/(No+Io) of approximately 7.5 dB.

In a preferred embodiment, the BER is estimated by using a measure of Eb/(No+Io). The instantaneous level of the "I" and "Q" outputs of the modem 108 (FIG. 7), 208 (FIG. 8) is sampled when the "I" signal is at its peak and the "Q" signal is crossing the zero. At that instant, "I" represents Eb+No+Io while "Q" represents No+Io (Eb is zero). Subtracting "Q" from "I" yields "Eb" and dividing this by "Q" yields Eb/(No+Io). The BER is determined by correlating the Eb/(No+Io) by the "ERF-function". This is desirably performed by a look-up table located in communication station 100 or subscriber unit 200. In another embodiment, the look up table may also be located in storage medium 62 (FIG. 5) of SCS 65 (FIG. 5).

Based on the bit energy to noise power spectral density, controller 84 generates a link-quality indicator (see blocks 111 and 211, FIGS. 7, 8). In a preferred embodiment, the link-quality indication is a two or three bit code. Table I shows an example of link-quality indicators suitable for use in a preferred embodiment of the present invention as related to the margin of received signal quality relative to minimum acceptable performance.

TABLE I

| Eb/(No + Io) Margin (dB) | LQI Code 2 1 |
|---|---|
| <0.0 | 0 0 |
| 0.0 to 2.0 | 0 1 |
| 2.0 to 6.5 | 1 0 |
| >6.5 | 1 1 |

After the link-quality indicator (LQI) is calculated, the LQI is encoded by encoder 112 (FIG. 7) and transmitted back to the transmitting station. The LQI may be transmitted as part of the payload of a data packet included as part of the system control data 37 (FIG. 2). In a preferred embodiment, the LQI is transmitted, for example, as part of a maintenance burst that is transmitted by subscriber unit 26 (FIG. 1) and satellite node 12 (FIG. 1) at least once every four frames. The payload of a data packet dedicated to maintenance burst information includes system control data 37 (FIG. 2) but preferably includes no subscriber traffic 39 (FIG. 2).

Figure 9:
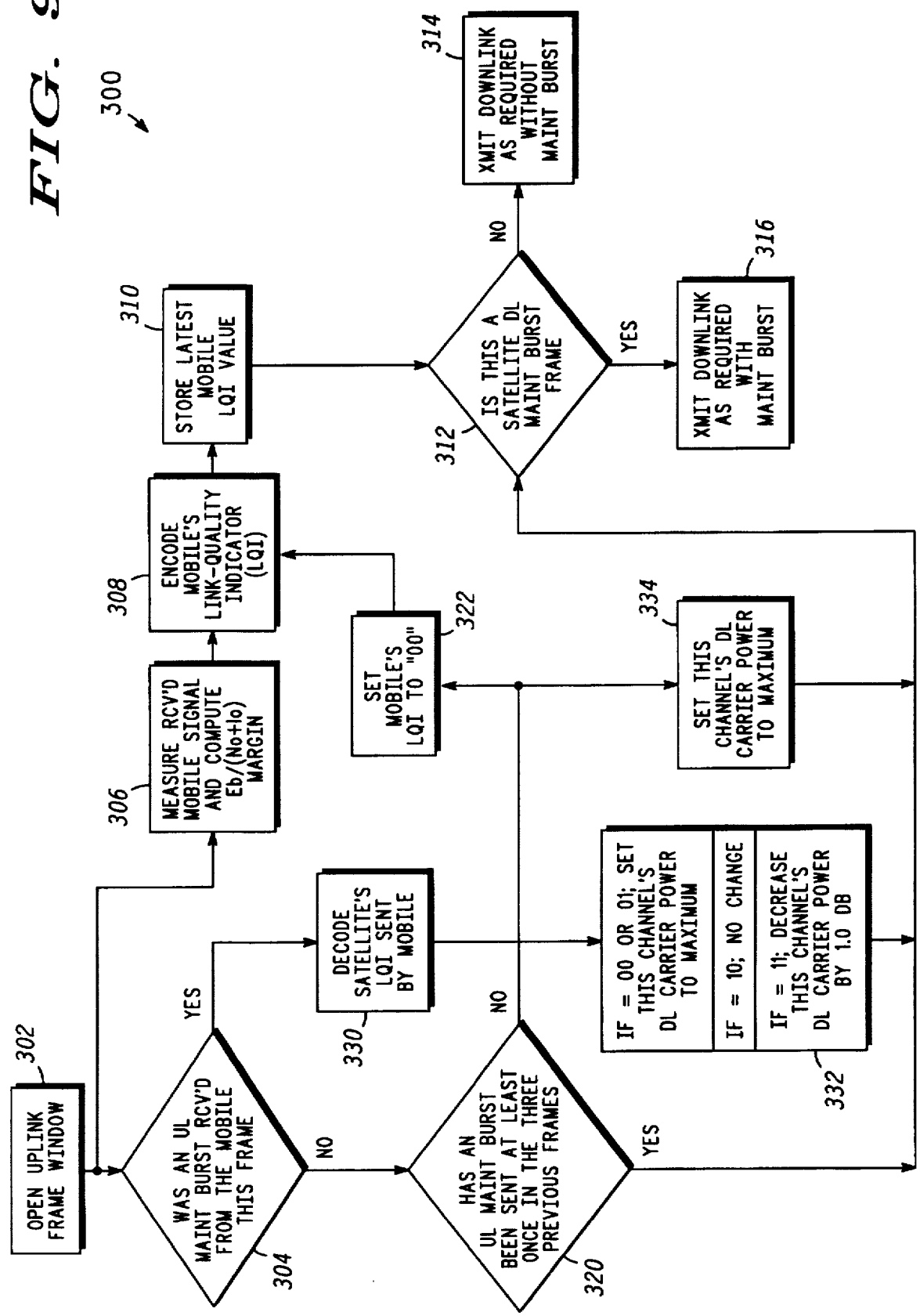
FIG. 9 shows a flow chart of an adaptive power control procedure performed by a satellite radio station communicating with a subscriber unit in a preferred embodiment of the present invention.

FIG. 9 shows a flow chart of an adaptive power control procedure 300 performed by a satellite radio station communicating with a subscriber unit in a preferred embodiment of the present invention. Procedure 300 is performed once for every data packet received at satellite node 12 (FIG. 1) from subscriber unit 26 (FIG. 1). Procedure 300 is performed by satellite node 100 desirably in parallel with other procedures necessary to manage communications.

In task 302, the satellite node opens an uplink frame window to receive data packet 30 (FIG. 2) from a subscriber unit during an uplink frame window. Task 306 measures the received signal quality at each burst and computes the Eb/(No+Io) margin. Eb is the energy received per bit and No+Io is the total noise power spectral density. Task 304 determines whether the data packet received from subscriber unit 26 includes an uplink (UL) maintenance burst. Task 308 encodes a link-quality indicator for the subscriber unit. Task 310 stores the link-quality indicator. Task 312 waits until the satellite node is ready to transmit a downlink maintenance burst, and task 316 transmits the link-quality indicator with the next downlink (DL) maintenance burst frame.

If the received burst was not a maintenance burst or if no burst was received this frame, task 320 determines whether an uplink maintenance burst has been sent at least once in the three previous frames. If not, the LQI of the subscriber unit is set to "00". The LQI is encoded for subsequent data packets in task 308 and stored by task 310.

If task 304 determines that the burst received includes an uplink (UL) maintenance burst, tasks 330 and 332 are performed in parallel with tasks 306 through 310 as previously discussed. Task 330 decodes the LQI included in the uplink (UL) maintenance burst. This LQI includes information on the quality of prior communications received by the subscriber unit. Task 332 directs satellite node 12 to increase, decrease, or maintain the same transmit power level depending on the decoded LQI. For example, where the LQI is a two bit code, a "00" or "01" directs satellite node to set transmit power to maximum. If the LQI received is a "10" for example, satellite node is directed not to change the transmit power level. If the LQI received is "11", for example, satellite node 12 is directed to decrease the transmit power level to that particular subscriber unit by 1.0 db. Those of skill in the art will understand that the number of bits utilized for the LQI is not important to the present invention. For example, three bits may be used, and they may direct a satellite node to increase transmit power by 1.0 dB, decrease transmit power by 2 dB, etc. In another preferred embodiment, the LQI's of TABLE I, for example may also be utilized.

If a maintenance burst has been sent at least once in the past three previous frames, task 320 directs control to task 312 which waits until the next downlink (DL) maintenance burst. When it is time for the next downlink (DL) maintenance burst, task 316 transmits, on the downlink to subscriber unit, the maintenance burst which includes the LQI, and also transmits other communication information. If it not time for the maintenance burst, task 314 transmits communication information downlink without the maintenance burst.

Figure 10:
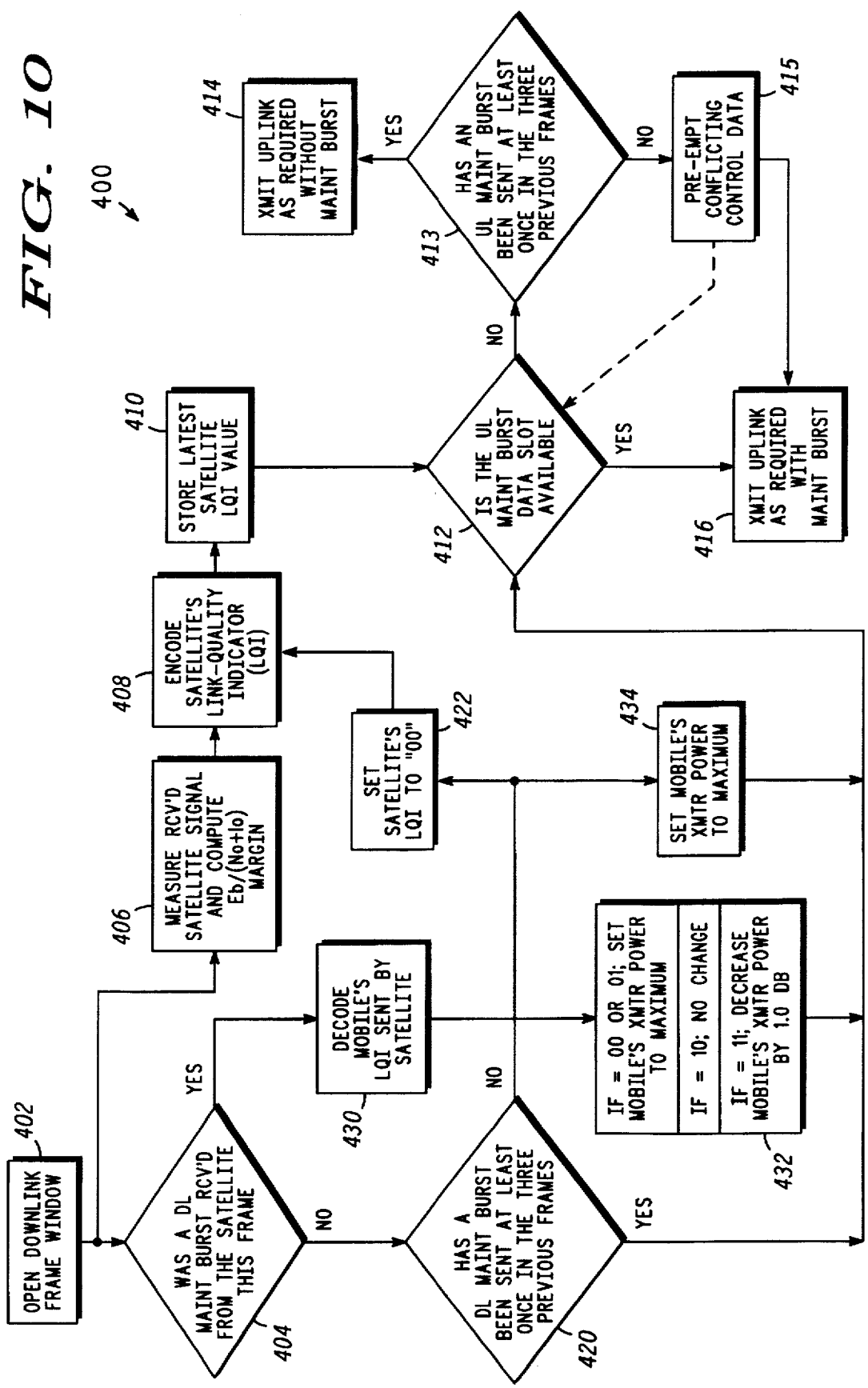
FIG. 10 shows a flow chart of an adaptive power control procedure performed by a subscriber unit communicating with a satellite ratio communication station in a preferred embodiment of the present invention.

FIG. 10 shows a flow chart of adaptive power control procedure 400 performed by a subscriber unit communicating with a satellite ratio communication station in a preferred embodiment of the present invention. Procedure 400 is performed once for every data packet received from a satellite node at a subscriber unit. Procedure 400 is performed by subscriber unit 200 desirably in parallel with other procedures necessary to manage communications with system 10 (FIG. 1).

In task 402, the subscriber unit opens a downlink (DL) frame window to receive data packet 30 (FIG. 2) from a satellite node during a downlink (DL) frame window. Task 406 measures the received signal quality and computes the Eb/(No+Io) margin. Eb is the energy received per bit and No+Io is the total noise power spectral density. Task 404 determines whether the data packet received from the satellite node includes a downlink (DL) maintenance burst. Task 408 encodes a link-quality indicator for the satellite node. Task 410 stores the link-quality indicator. Task 412 waits until the subscriber unit is ready to transmit an uplink (UL) maintenance burst, and task 416 transmits the link-quality indicator with the uplink (UL) maintenance burst.

If task 404 determines that the burst received is a downlink (DL) maintenance burst, tasks 430 and 432 are performed in parallel with tasks 406 through 410 as previously discussed. Task 430 decodes the LQI included in the maintenance burst. This LQI includes information on the quality of prior communications received at the subscriber unit by the satellite node. Task 432 directs subscriber unit 26 to increase, decrease, or maintain the same transmit power level depending on the decoded LQI.

For example, where the LQI is a two bit code, a "00" or "01" directs subscriber unit 26 (FIG. 6) to set transmit power to maximum. If the LQI received is a "10" for example, subscriber unit 26 is directed not to change the transmit power level. If the LQI received is "11", for example, subscriber unit 26 is directed to decrease the transmit power level to that particular satellite node by 1.0 db. Those of skill in the art will understand that the number of bits utilized for the LQI is not important to the present invention. For example, three bits may also be used, and may direct a subscriber unit to increase transmit power by 1.0 dB, decrease transmit power by 2 dB, etc. In another preferred embodiment, the LQI's of TABLE I, for example may be utilized. This information is desirably stored in subscriber unit 200.

If the received burst was not a downlink (DL) maintenance burst, task 420 determines whether an downlink (DL) maintenance burst has been sent once in the three previous frames. If not, task 422 sets the LQI of the satellite node at "00". The LQI of "00" requests maximum downlink transmission power. The LQI is encoded for subsequent data packets in task 408 and stored by task 410.

If a downlink (DL) maintenance burst has been sent at least once in the past three previous frames, task 420 directs control to task 412. Task 412 determines if an uplink (UL) time-slot is available for an uplink (UL) maintenance burst. If available, the uplink (UL) maintenance burst is transmitted in task 416. If a slot is not available, task 413 determines if an uplink maintenance burst has been sent at least once in the three prior frames. If it has, task 414 transmits the next data packet on the uplink without the maintenance burst. If a maintenance burst has not been transmitted during the prior three frames, task 415 pre-empts conflicting control data.

While the invention has been described in terms of specific examples and with specific preferred embodiments, it is evident that many alternatives and variations will be apparent to those skilled in the art based on the description herein, and it is intended to include such variations and alternatives in the claims.

As described herein, the advantages of the present invention will be apparent to those of skill in the art and provide an improved method of operating various parts of a communication system. These advantages include dynamic power control of transmission power of each communication station in a communication system. Other advantages include a method and apparatus to provide for adjustment of transmission power of satellite transmitting stations not only to conserve power, but so that the lowest reliable power level of power will be used and thereby reduce the likelihood of interference among co-channel cells of nearby antenna beams engaged in different calls.

Additional advantages include controlling power level adjustments of the transmission power of a transmitting station based on the signal quality received at a receiving station. Additional advantages include independent dynamic power control of a satellite transmitter and a mobile unit transmitter. Additional advantages also include independent power control of each link with non-reciprocol link propagation characteristics. Additional advantages include independent power control when transmitting stations are in different interference environments. Further, additional advantages include providing reciprocal signal quality information on a link or channel separate from the communication link channel.

What is claimed is:

1. A method of operating a satellite communication node in non-geostationary orbit, said node communicating with mobile units using data packets, each data packet having a payload portion containing digital voice data and digital control data, the method comprising the steps of:

communicating digital voice data within said data packets with said mobile unit over a traffic channel that has a continually changing propagation distance, said digital voice data being communicated in said payload portion of said data packets;

receiving from said mobile unit on said traffic channel at said satellite node, a link-quality indicator (LOI) that represents the quality of said voice data received by said mobile unit on said traffic channel, the LOI being received in said control data portion of said payload portion of said data packets;

adjusting at said node based on said LOI, a transmission power level for subsequent communications on said traffic channel;

repeating the receiving and adjusting steps regularly during the performance of the communicating step to compensate for changes in propagation characteristics as said propagation distance between said satellite node and said mobile unit changes sending from said satellite node to said mobile unit on said traffic channel, a second LQI representing a quality level of communications received from said mobile unit, said second LQI being sent in said control data portions of said data packets; and receiving, during the communicating step, digital voice data from said mobile unit on said traffic channel, said voice data having been transmitted by said mobile unit at a power level responsive to said second LQI, said digital voice data being received in said payload portion of said data packets.

wherein some of said data packets have digitized voice data being communicated between the mobile unit and the satellite communication node are devoid of link quality information, and wherein the repeating of the receiving and adjusting steps regularly, said LQI is included on a regular basis within other data packets that include said digitized voice data.

2. A method as claimed in claim 1 further comprising the step of said satellite node generating said second LQI based on a ratio of received energy per bit to total noise power spectral density of said communications received from said mobile unit over said traffic channel during the communicating step, and wherein said receiving said LQI step comprises the step of receiving said LQI within said data packets, said LQI generated by said mobile unit based on received energy per bit to total noise power spectral density of communications received at said mobile unit over said traffic channel.

3. A method as claimed in claim 2 wherein said satellite communication node provides a plurality of antenna beams on earth's surface, said antenna beams having non-interfering traffic channels in adjacent of said antenna beams, said method further comprising the steps of:

communicating digitized voice data within data packets with a plurality of mobile units over assigned traffic channels that have continually changing propagation distances, some of said mobile units of said plurality being located in different of said antenna beams;

receiving on said traffic channels within data packets from each mobile unit of said plurality, a LQI representing the quality of said voice data received by each mobile unit on the assigned traffic channel;

individually adjusting transmission power levels of each traffic channel based on the associated LQI; and repeating the receiving and individually adjusting steps during the performance of the communicating with said plurality step as said propagation distances between said satellite communication node and each of said subscriber units change.

4. A method as claimed in claim 3 further comprising the steps of:

generating, by said satellite node an individual LQI for each mobile unit of said plurality, each individual LQI based on the quality of communications received from said each mobile unit;

sending within data packets, said individual LQI to said mobile unit associated therewith on said assigned traffic channel; and receiving subsequent communications from each of said mobile units, said subsequent communications having been transmitted at a power level responsive to said individual LQI.

5. A method as claimed in claim 4 wherein each of said assigned traffic channels comprise time-slots of a frequency channel that is time division multiplexed and frequency division multiplexed, some of said assigned traffic channels being different time slots on a same frequency channel, and wherein the individually adjusting step further comprises individually adjusting transmission power levels during assigned time slots of said same frequency channel.

6. A method of operating a node in a communication system adapted for controlling transmission power levels for communication with a mobile unit, said method comprising the steps of:

sending over a communication link at a transmission power level, a communication from said node to said mobile unit;

receiving at said node from said mobile unit, a link-quality indicator (LQI) representing the quality of said communication;

adjusting at said node based on said LQI, said transmission power level of said communication link;

receiving from said mobile unit, a second communication on a second communication link;

said communication system generating a second LQI for said second communication link based on a quality level of said second communication; and sending said second LQI to said mobile unit, said mobile unit responsive to said second LQI, wherein said mobile unit transmits digital data over said communication second link, and said generating step comprises the step of generating by said node said second LQI based on a ratio of a received energy per bit to total noise power spectral density of said second communication, said total noise power spectral density including interference noise power, wherein said generating step further comprising the step of determining said ratio from a bit-error-rate received at said node, and said adjusting step comprises the step of increasing said mobile unit transmission power level when said bit-error-rate exceeds a predetermined value, and wherein said bit-error-rate is estimated by sampling an instantaneous level of I and Q demodulator output signals when said I output signal is at a peak and said Q output signal is crossing zero.

7. A method of operating a subscriber unit adapted for communicating with a satellite communication node in non-geostationary orbit, said method comprising:

communicating digitized voice data within data packets with said satellite node over a traffic channel that has a continually changing propagation distance;

receiving, within said data packets containing said digitized voice data, on said traffic channel at said subscriber unit, a link-quality indicator (LQI) representing the quality of said voice data received by said satellite node during the communicating step, said LQI being calculated by said satellite communication node and based on a ratio of a received energy per bit to total noise power;

adjusting a transmission power level at said subscriber unit during subsequent performance of the communicating step based on said LQI;

repeating the receiving and adjusting steps regularly during the performance of the communicating step to compensate for changes in propagation characteristics as said propagating distance between said satellite node and said mobile unit changes;

communicating over said traffic channel, data packets containing digitized voice data, some of said data packets being devoid of link quality information;

on a regular basis, including said LQI within said data packets, the including step being part of a regularly performed link maintenance burst;

sending from said subscriber unit to said satellite communication node on said traffic channel, a second LQI within data packets containing digitized voice data, said second LQI based on a second ratio of a received energy per bit to total noise power for communications received at said subscriber unit; and receiving, during the communicating step, voice data within data packets from said satellite communication node on said traffic channel, said voice data having been transmitted by said satellite communication node at a power level responsive to said second LQI, wherein the sending step is performed on a regular basis as said propagation distance between said subscriber unit and said satellite communication node changes.

8. A method of operating a satellite communication node adapted for controlling transmission power levels for communication with a mobile unit, said method comprising the steps of:

sending over a communication link at a transmission power level, a communication from said node to said mobile unit;

receiving at said satellite communication node from said mobile unit, a link-quality indicator (LQI) representing the quality of said communication, the receiving step being performed by a receiver;

adjusting at said node based on said LQI, said transmission power level of said communication link;

receiving from said mobile unit, a second communication on a second communication link;

said communication system generating a second LQI for said second communication link based on a signal quality of said second communication, said signal quality including a ratio of a received energy per bit to total noise power spectral density, said ratio determined at least in part from a bit-error-rate of said second communication, said bit-error-rate being estimated by sampling an instantaneous level of I and Q demodulator output signals in said receiver when said I output signal is at a peak and said Q output signal is crossing zero; and sending said second LQI to said mobile unit, said mobile unit responsive to said second LQI, wherein said adjusting step comprises the step of increasing said of said first communication link when said bit-error-rate exceeds a predetermined value.

* * * * *